United States Patent
Payne et al.

[19]

[11] Patent Number: 5,854,694
[45] Date of Patent: Dec. 29, 1998

[54] PORTABLE COMMUNICATION APPARATUS

[75] Inventors: Simon Graham Payne, Cullompton; Stephen John Love, Over, both of Great Britain

[73] Assignee: Optionexist Limited, United Kingdom

[21] Appl. No.: 727,437
[22] PCT Filed: Apr. 13, 1995
[86] PCT No.: PCT/GB95/00849
  § 371 Date: Dec. 17, 1996
  § 102(e) Date: Dec. 17, 1996
[87] PCT Pub. No.: WO95/28800
  PCT Pub. Date: Oct. 26, 1995
[51] Int. Cl.⁶ .................... H04N 1/04; H04M 11/00
[52] U.S. Cl. ............. 358/473; 358/497; 379/100.02
[58] Field of Search .................. 358/400, 473, 358/474, 450, 497, 468, 442, 402; 379/100.01, 100.02; 380/18

[56] References Cited

U.S. PATENT DOCUMENTS

| 4,652,937 | 3/1987 | Shimura | 358/474 |
| 4,742,559 | 5/1988 | Fujiwara | 358/400 |
| 4,796,091 | 1/1989 | Nohtomi | 358/474 |
| 4,887,227 | 12/1989 | Tsujioka | 382/9 |
| 5,115,374 | 5/1992 | Hongoh | 358/400 |
| 5,172,243 | 12/1992 | Hayashi | 358/400 |
| 5,611,033 | 3/1997 | Pitteloud et al. | 358/450 |
| 5,657,375 | 8/1997 | Connolly et al. | 455/450 |
| 5,673,117 | 9/1997 | Ezumi et al. | 358/400 |

FOREIGN PATENT DOCUMENTS

| 0264872 | 4/1988 | European Pat. Off. . |
| 0393509 | 10/1990 | European Pat. Off. . |
| 0411698 | 2/1991 | European Pat. Off. . |
| 0505989 | 9/1992 | European Pat. Off. . |
| 2244188 | 11/1991 | United Kingdom . |

*Primary Examiner*—Kim Yen Vu
*Assistant Examiner*—Kimberly A. Williams
*Attorney, Agent, or Firm*—Gregory M. Howison

[57] ABSTRACT

A portable facsimile machine (10) for communicating image data to a remote machine, comprising an internal power source (20) and a user input device (28) for communicating with a controller (32) which controls the operation of devices within the machine including a scanner (16, 18) for inputting data representative of a scanned image into a memory (34), a display (12) for a user to view the scanned image stored in the memory and a communication system having a transducer (36) which creates a signal representative of the image data to enable communication of the image data over a telecommunication system to the remote machine.

13 Claims, 2 Drawing Sheets

PORTABLE COMMUNICATION APPARATUS

TECHNICAL FIELD OF INVENTION

The invention relates to portable apparatus preferably capable of image acquisition, handling and communication and more particularly to lightweight hand-held apparatus.

BACKGROUND OF INVENTION

Known apparatus of this type include a cordless image scanner, known for example from EP 393509A2 which discloses a scanner having an in-built power source and an image sensor which reads image data representative of an image into a memory. The image can be shown on a display on the hand-held scanner or communicated to a computer using a memory card connector. A portable facsimile machine is also known, for example from U.S. Pat. No. 4,652,937 which discloses a rather large facsimile machine in two principal parts which are powered from a mains supply. The two parts can be positioned one above the other to enable an automatic paper feed operation of an image through the machine for facsimile transmission over a telephone network. Alternatively, the upper portion of the machine can be detached for manual scanning of an image such as a page of text from a book.

SUMMARY OF INVENTION

The known devices are however, of limited use due to the limited functions, such as image handling and communication functions, which they are able to perform, and their size and/or weight which creates a problem for portability. One known facsimile device taught by U.S. Pat. No. 4,796,091 is specifically limited to use in a vehicle in receiving facsimile transmissions.

The present invention seeks to avoid or at least mitigate these and other problems of the prior art. According to one aspect of the invention there is provided a machine for use in image scanning and the storage and transmission of data representative of the scanned image, the machine comprising an internal power source and a user input device for communicating with a controller which controls the operation of devices within the machine which devices comprise a scanner for inputting data representative of a scanned image into a memory, a display for a user to view the scanner image stored in the memory and a communication system having a transducer operable to create an outgoing signal representative of the image data to enable transmission in use of the image data. Beneficially therefore, this aspect of the invention enables the machine, which is preferably a facsimile machine, to be truly portable since it has its own power source and scanned images can be taken from otherwise inaccessible places and stored in memory prior to transmission to a remote device such as, for example, another such machine for use in image scanning, for example a facsimile machine having a printer or a computer.

Preferably the transducer is a modem which generates an audio signal which modem is preferably adapted also to receive and convert an incoming signal representative of an image to provide image data to be viewed on the display as a copy of the image.

Preferably the machine is an integral hand-held device which is preferably lightweight and operable by a user using one hand.

The scanner can be positioned adjacent to an outside surface of the machine and preferably the opposite surface to that having the display.

The scanner can comprise a roller device for providing position reference information during a scanning operation which roller device has a roller which comprises 2 or more separately rotatable portions at different axial positions, their positions being provided with respective angular displacement encoders operable to communicate to the controller respective signals representative of displacement of the machine relative to the scanned image during scanning to enable correction of image data for arcuate movement of the machine or non-linear scanning of the scanned image.

Preferably, a user is able to manipulate image data by communicating with the controller via the user input, preferably the image contrast can be adjusted, and/or the image brightness can be adjusted, and/or the image can be magnified or reduced in size.

The machine can have an encrypting device which encodes the image data so that it requires decoding by an appropriate decryption device to convert the image data back to its original form.

The machine can be adapted for use with a base station which comprises a device for recharging the power source, and/or a telephone connectable to a telecommunication system, and/or an answering machine, and/or a computer, and/or a printer.

Another aspect of the invention provides a facsimile system comprising a non-portable facsimile apparatus and a machine as defined above, and means for detachably connecting the machine to the apparatus.

Preferably, the non-portable apparatus comprises a device for recharging the power source, and/or a telephone connected to a telecommunication system, and/or an answering machine, and/or a computer, and/or a printer.

BRIEF DESCRIPTION OF DRAWINGS

The invention will now be described, by way of example only, with reference to the accompanying drawings, in which.

DETAILED DESCRIPTION OF INVENTION

Figure 1:
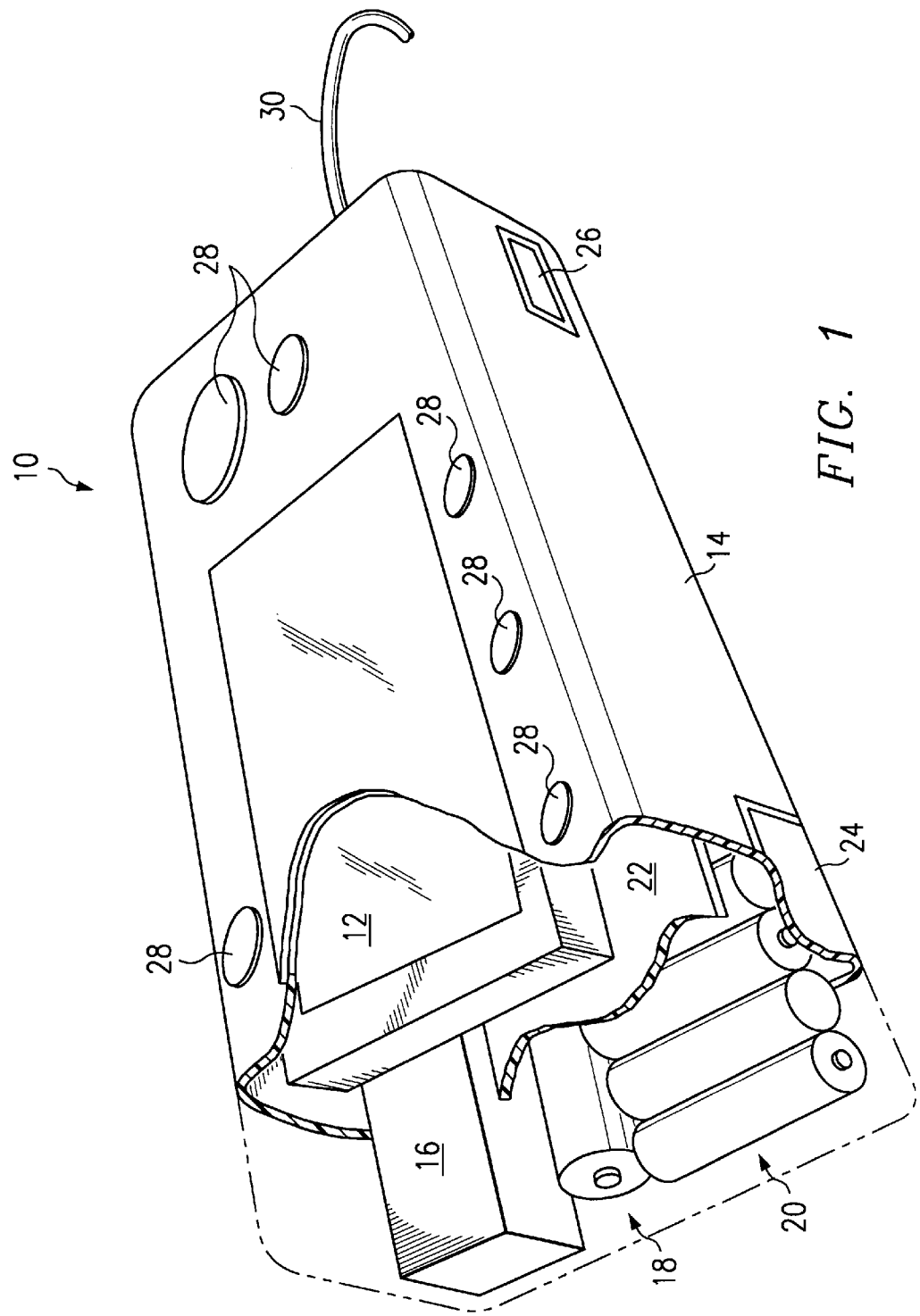
FIG. 1 is a schematic perspective view of a machine according to the invention having part of its body cut away.

The drawings illustrate a machine 10 for use in image scanning and the storage and transmission of data representative of the scanned image, the machine comprising an internal power source 20 and a user input device 28 for communicating with a controller 32 which controls the operation of devices 16, 12, 36 within the machine which devices comprise a scanner 16 for inputting data representative of a scanned image into a memory 34, a display 12 for a user to view the scanned image stored in the memory and a communication system having a transducer 36 operable to create an outgoing signal representative of the image data to enable transmission in use of the image data. More particularly, a portable facsimile machine 10 is shown comprising a display 12 such as a liquid crystal display for example, housed in an outer casing 14. Other external features include user input devices 28 which can be simple switches such as rubber push buttons connected to a keypad encoder 29 such as an Intel 82C55 P10 for example.

The machine 10 is adapted to communicate to a remote facsimile machine using a telecommunication system such as a telephone network for example. Accordingly machine 10 can have a transmission line 30 which is adapted to connect it to a telephone system which can be a traditional land line system or mobile phone system such as a cellular network. A socket 26 is provided to enable the machine to be connected to peripheral devices such as a printer or computer for example, or a base station to be described later. Other input and output ports could of course be provided for the various functions to be described later. Also visible from the outside of the machine 10 is a removable portion 24 of casing 14 which allows as access to an internal power source 20 such as a series of batteries as shown here.

Within the machine 10 there is an image scanner 16 and contact roller 18. In this embodiment the scanner and roller are positioned on the bottom face of machine 10, opposite the display 12 in the upper face. Beneficially, especially with transmission line 30 removed, the machine 10 can be entirely symmetrical so that when scanning an image there is no need to orientate machine 10 left or right, or up or down with respect to the image to be scanned. The machine is therefore user friendly both to left- and right-handed users. Prior to sending a facsimile of a scanned image, a controller, to be described later, can be instructed by the user to change the orientation of the scanned image, though of course, this may not be necessary if the recipient, remote facsimile machine provides a hard copy of the facsimile.

Figure 2:
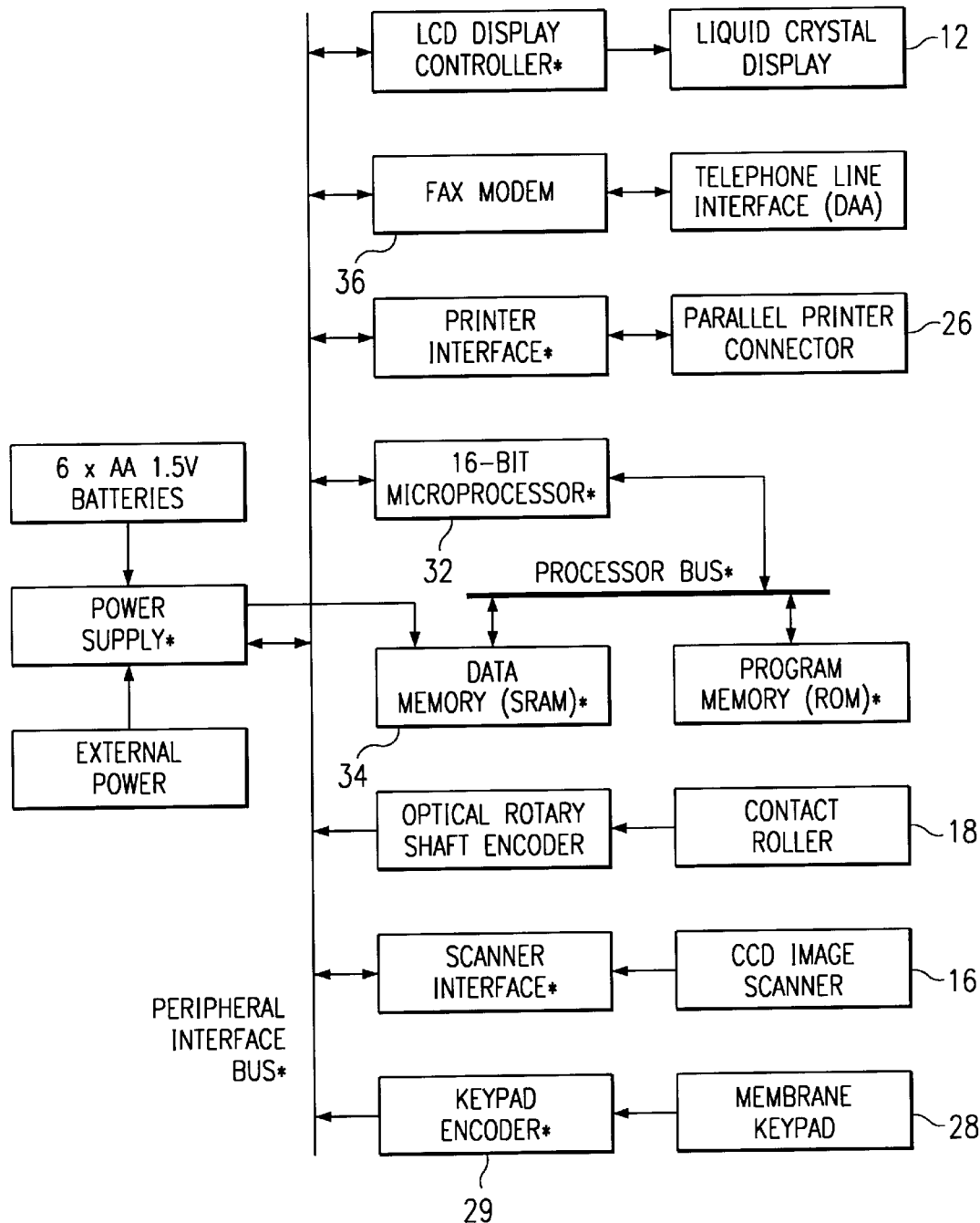
FIG. 2 is a block diagram of the main features of the machine shown in FIG. 1.

The majority of the electronic components used in machine 10 are mounted on a printed circuit board 22 and can be described in more detail with reference to FIG. 2. The main controller of the machine is a micro-processor which can for example be an Intel 16 bit 80C186 device. The controller can be connected to all other devices including the power supply along an interface bus and a processor bus.

The power supply system for machine 10 can comprise an internal battery source of for example six 1.5 volt "AA" size batteries connected to a Maxim 690A. Rechargeable batteries may be used. Additionally, it is possible for the machine 10 to have an input port for supply of external power source from for example a rectifying transformer connected to an AC mains supply.

A user operates machine 10 by activating it using an input device such as one of the buttons 28 which then activates the controller to cause a menu of function options to be displayed on screen 12. Preferably, graphical user interfacing displays are used throughout the operation of machine 10 in order to provide a user friendly machine. Of course, a "mouse ball" could be used to enable the user to scroll a cursor across screen 12 to select a function described displayed thereon, and only one push button 28 can be provided in this format.

The user can then select to scan an image which activates the electronic system to read an image passed beneath scanner 16 into a data memory 34. Machine 10 preferably comprises a CCD image scanner such as a Kyocera KIC-216-8AFJ contact CCD scanner connected via a scanner interface comprising a teledyne TC430CPA and LM318 op amps to the interface bus. The data memory is preferably an SRAM of four megabytes comprised of Hitachi 628128 SRAM devices. Of course, larger or smaller data memories can be provided depending on the amount of data a user requires to store.

The contact roller 18 communicates with the controller 32 via an optical rotary shaft encoder which can for example be an Hewlett Packard HEDS900 and HEDS6100 wheel. The contact roller can be a 20 mm diameter rubber coated roller. Preferably, the roller is segmented into 2 or more portions in order to enable data from each segment of the roller to be communicated to controller 32 thereby to enable compensation of any arcing, or non-linear, movement of the machine during the scanning of an image. Thus, the image data stored in data memory 34 can be automatically corrected to compensate for any such non linear movement.

The user can ensure that the data stored is acceptable by having the image displayed on screen 12. Preferably, the display comprises an Hitachi HD61830LCD controller and an Hitachi LM300XM 240X64 Pixel LCD. If the image shown in satisfactory, the user can simply leave the image data in memory 34 for later use, e.g. printing on a remote printer or transmission to a computer, or the user can fax the image to a remote facsimile machine. A portable facsimile machine 10 preferably comprises a fax modem 36 such as a Rockwell R96V24ACW 9600 baud device. Additionally, the transmission line 30 preferably comprises a telephone line interface (DAA) such as an Xecom XE1020 international DDA.

To print the scanned image on a remote printer a printer interface can be provided such as an Intel 82C55PIO connected to a parallel printer connector 26 for example, such as a 25 pin D socket which is preferably centronics compatible.

Beneficially, the facsimile machine 10 can be used both to transmit and receive facsimiles and can for example be used in a normal office environment. Facsimiles received by machine 10 are not automatically printed out but enable a user first to read an incoming facsimile, which is stored in data memory 34, on display 12 prior to having the facsimile printed, thus enabling the user to determine whether he requires a hard copy of the fax. Of course, this provides a saving in the use of paper. Additionally, the machine 10 can be used to send facsimile copies of images in the manner described above. Beneficially, in this office environment, the machine 10 can be connected to an existing land line telephone system by a transmission line 30 and to mains supply power source which can be used to recharge the internal power source such as the batteries 20 described in this particular embodiment.

However, a significant advantage of the portable facsimile machine 10 is that it can be disconnected from the telephone system and mains supply and carried to documents (which might otherwise be difficult to copy) and transmit by facsimile thereof. For example, the documents might be provided in reference-only texts within a library, in large text books or in other generally inaccessible locations. A facsimile of the image can be transmitted by connecting machine 10 to any available telecommunication system including for example a public telephone by connecting machine 10 via a transmission line 30 connected to an audio coupling device adapted to attach to a telephone hand-set. Additionally, transmission line 30 can be connected to a mobile telephone system, again for example by providing an audio coupling device to be attached to a mobile telephone hand-set or other interfacing device.

For office use for example, machine 10 can be provided with a base station (not shown) to which machine 10 is connected. The base station can comprise for example a transformer and rectifying system for powering the machine, a telephone, an answering machine and a printer or any one of these devices individually. The facsimile base station can comprise an automatic voice/fax recognition system for automatic switching between a telephone and the facsimile machine 10.

The program memory 36 stores a system program for operating in particular controller 32 and thus whole system of machine 10 can be for example an Intel 27C020 2 megabyte EPROM. The system software can provide many options such as a multilingual display, a facility to manipulate the image data so that the displayed image can be magnified or reduced. This is particularly useful when the resolution of the display is less than the resolution of the image since the scanned image can be magnified for example. The image can also be checked for brightness and contrast prior to transmission and for example, an automatic adjustment can be made or alternatively the system can provide for manual adjustment of brightness and contrast of an image.

The stored images can be labelled by a user to enable cataloguing within the data memory 34. A stored document or image data can be represented on the display 12 using a document icon or "thumb-nail" image of the document. The system preferably enables the user to select one of several options, such as erasing a document from memory, viewing the document on the screen for example to adjust brightness and contrast, to check that the image is otherwise satisfactory for transmission, transmission to a printer, transmission as a fax, or to enable the document to be copied into a new image. Alternatively, sections of the image can be selected for any one of these functions.

Preferably, scanned images are compressed using known data compression techniques prior to storage in memory 34. Controller 32 will of course provide for decompression of the stored data.

Preferably, the device comprises a self-testing facility and presents the results thereof on the display 12. Alternatively, the results can be transmitted to a printer or as a fax. Preferably, the machine 10 comprises a facility to be tested remotely for example by an engineer using a machine equipped with a fax to communicate with machine 10 thereby to carry out some diagnostic tests. The same interface can be used for loading in a new set of instructions to controller 32, thereby enabling machine 10 to communicate with a new type of printer for example.

Preferably, a display is provided of the charge level of the internal power source. If the power source such as batteries 20 is too low to enable satisfactory operation of machine 10, then a message is displayed to this effect on screen 12 and a given operation is aborted. If the power source is very low, machine 10 will not operate at all thereby preserving the contents of memory 34. To replace the internal power source, portion 24 of casing 14 is removed and preferably the machine 10 comprises a temporary secondary power source which enables power to be provided to memory 34 for a predetermined period sufficient to enable replacement of the batteries. A period of say 15 seconds might be appropriate.

Naturally, where connection to a public telephone network is required, it is necessary for machine 10 to be approved for connection to the public telephone network in a given country. The telephone connection portion 30 of machine 10 is therefore separable from machine 10 and can be provided in a suitable format for a given country of use.

It is possible to remove the facsimile facility from the machine and utilize the machine for image acquisition and storage or printing a hard copy by direct connection to a printer, eg. a laser printer.

The scanner could be either a color or black and white scanner. The display can be color or black and white. Similarly, the facsimile transmission can be in color or black and white. If machine 10 is functional entirely in color, it is possible to print images on a primary color printer using a dithering technique to generate acceptable results. Preferably also, the machine 10 uses a dithering technique when scanning an image to provide for simulation of a grey scale image when using a black and white printer.

An additional feature which may be provided in machine 10 is data encryption which enables an image to be transmitted as a fax but also in an encoded form during transmission thus requiring decoding by the remote facsimile machine receiving the encoded image.

One of the principal benefits of facsimile machine 10 is that it is portable and accordingly it should preferably be a hand-held device having dimensions in the order of say 24 cm×10 cm×4 cm. Thus, the device is capable of scanning A4 size paper of width approximately 21 cm. Additionally, it is apparent that since many devices such as printers and mains transformers are detachable from machine 10, the weight of the machine can be kept to a minimum.

The machine may optionally be provided with one or more removable storage memory units to enable the machine to have additional memory capacity. Such removable memory units would enable storage of more image data, as would be beneficial if the machine were to be used as a copier.

The controller may optionally provide the facility to overlay one image with another such that the stored image data represents a composite image. This would enable a user to annotate an image by drawing the annotation on a sheet of paper and scanning the paper a previously stored image having the scanned annotations added thereto, for example.

The machine may also be adapted to receive and display electronic mail (E-mail) and to transmit image data together with superimposed E-mail address information.

We claim:

1. A portable facsimile machine (10) for use in image scanning and the storage and transmission of data representative of the scanned image, the machine comprising a housing, which housing contains an internal power source (20) and a user input device (28) for communicating with a controller (32) which controls the operation of devices (16, 12, 36) within the machine and the housing, which devices comprise a scanner (16) for manually scanning an image and inputting data representative of a scanned image into a memory (34), a display (12) for a user to view the scanned image stored in the memory and a communication system having a transducer (36) operable to create an outgoing signal representative of the image data wherein the outgoing signal is suitable for communication with a remote facsimile machine to enable transmission of the image data to a remote location via a telecommunications system.

2. A machine as claimed in claim 1 wherein the transducer is a modem (36) which generates the outgoing signal as an audio signal.

3. A machine as claimed in claim 1 wherein the transducer is operable also to receive and convert an incoming signal representative of a received image to provide image data to be stored in the memory and viewed on the display as a copy of the received image.

4. A machine as claimed in claim 3 adapted to receive and display electronic mail and to transmit image data together with superimposed electronic mail address information.

5. A machine as claimed in claim 1 comprising one or more removable storage memory units operable to store image data thereby increasing the memory capacity of the machine.

6. A machine as claimed in claim 1 which is integral and hand-held and which is lightweight and operable by a user using one hand.

7. A machine as claimed in claim 1 wherein the scanner and the display are positioned at respective opposite outside surfaces of the machine.

8. A machine as claimed in claim 1 wherein the scanner comprises a roller device (18) for providing position reference information by rolling contact with the scanned image during a scanning operation, which roller device has a roller which comprises two (2) or more separately rotatable portions at different axial positions, their positions being provided with respective angular displacement encoders operable to communicate to the controller respective signals representative of displacement of the machine relative to the scanned image during scanning to enable correction of image data for accurate movement of the machine or non-linear scanning of the scanned image.

9. A machine as claimed in claim 1 wherein the controller comprises a micro-processor operable to manipulate image data in response to inputs received via the user input, including the adjustment of the image contrast, and/or the image brightness, and/or the magnification of the image.

10. A machine as claimed in claim 9 wherein the micro-processor is operable to overlay one image with another such that the stored image data represents a composite image.

11. A machine as claimed in claim 1 further comprising an encrypting device which encodes the image data so that it requires decoding by an appropriate decryption device to convert the image data back to its original form.

12. A facsimile system comprising a non-portable facsimile apparatus and a machine according to claim 1, and means for detachably connecting the machine to the non-portable facsimile apparatus.

13. A facsimile system as claimed in claim 12 wherein the non-portable facsimile apparatus comprises a charging device for recharging the power source.

* * * * *